US008876441B2

(12) United States Patent
Majima

(10) Patent No.: US 8,876,441 B2
(45) Date of Patent: Nov. 4, 2014

(54) CUTTING INSERT HAVING CHIP BREAKER

(71) Applicant: Tungaloy Corporation, Iwaki (JP)

(72) Inventor: Shinya Majima, Iwaki (JP)

(73) Assignee: Tungaloy Corporation, Iwaki-shi, Fukushima (JP)

( * ) Notice: Subject to any disclaimer, the term of this patent is extended or adjusted under 35 U.S.C. 154(b) by 127 days.

(21) Appl. No.: 13/667,941

(22) Filed: Nov. 2, 2012

(65) Prior Publication Data
US 2013/0094914 A1    Apr. 18, 2013

Related U.S. Application Data

(63) Continuation-in-part of application No. PCT/JP2011/060589, filed on May 6, 2011.

(30) Foreign Application Priority Data

May 11, 2010  (JP) ................. 2010-109587

(51) Int. Cl.
| B23B 27/22 | (2006.01) |
| B23B 27/14 | (2006.01) |
| B23B 27/16 | (2006.01) |
| B23B 5/20  | (2006.01) |

(52) U.S. Cl.
CPC .......... B23B 27/1607 (2013.01); B23B 27/143 (2013.01); *B23B 2200/087* (2013.01)
USPC ............ 407/115; 407/116; 407/113

(58) Field of Classification Search
CPC  B23B 27/1607; B23B 27/143; B23B 27/087; B23B 27/032; B23B 27/3645
USPC ........... 407/113, 114, 115, 116, 117
See application file for complete search history.

(56) References Cited

U.S. PATENT DOCUMENTS

| 3,815,192 A | 6/1974  | Ohtsu et al. |
| 4,626,141 A | 12/1986 | Malaker et al. |
| 5,032,049 A | 7/1991  | Hessman et al. |
| 5,122,017 A | 6/1992  | Niebauer |

(Continued)

FOREIGN PATENT DOCUMENTS

| JP | H08 118135 A | 5/1996 |
| JP | 2007-175788  | 7/2007 |

(Continued)

OTHER PUBLICATIONS

International Preliminary Report on Patentability (IPRP) issued in PCT counterpart application (No. PCT/JP2011/060589) with translation, Jul. 12, 2011.

(Continued)

*Primary Examiner* — Will Fridie, Jr.

(74) *Attorney, Agent, or Firm* — Womble Carlyle

(57) ABSTRACT

A cutting insert has an approximately polygonal plate shape with a cutting edge formed on a intersection portion between a rake face and a flank. A chip breaker is formed on the rake face, and a chip-breaker concave portion is defined by an inclined surface which is curved in a concave manner and which is smoothly connected to the bottom surface portion while being gradually inclined toward the bottom surface portion, from a peripheral edge portion on a nose portion side to a bottom surface portion.

18 Claims, 4 Drawing Sheets

(56) References Cited

U.S. PATENT DOCUMENTS

| | | | |
|---|---|---|---|
| 5,141,367 A | 8/1992 | Beeghly et al. | |
| 5,147,159 A | 9/1992 | Lowe et al. | |
| 5,222,843 A | 6/1993 | Katbi et al. | |
| 5,230,591 A | 7/1993 | Katbi et al. | |
| 5,282,703 A | 2/1994 | Itaba et al. | |
| 5,476,346 A | 12/1995 | Lundström | |
| 5,525,016 A | 6/1996 | Payàet al. | |
| 5,577,867 A * | 11/1996 | Paya | 407/114 |
| 5,743,681 A * | 4/1998 | Wiman et al. | 407/114 |
| 5,921,722 A | 7/1999 | Payàet al. | |
| 5,947,651 A * | 9/1999 | Murakami et al. | 407/114 |
| 7,182,555 B2 * | 2/2007 | Kitagawa et al. | 407/113 |
| 7,621,700 B2 | 11/2009 | Jonsson et al. | |
| 7,934,891 B2 * | 5/2011 | Jonsson et al. | 407/114 |
| 2013/0236258 A1 * | 9/2013 | Nada et al. | 407/114 |

FOREIGN PATENT DOCUMENTS

| | | |
|---|---|---|
| JP | 2009-006437 | 1/2009 |
| JP | 2010-069614 | 4/2010 |
| RU | 89999 U1 | 12/2009 |
| WO | WO 2009/005218 A1 | 1/2009 |

OTHER PUBLICATIONS

International Preliminary Report on Patentability (IPRP) issued in PCT counterpart application (No. PCT/JP2011/060589) with translation.

Extended European search report issued in EP counterpart application (No. 11780554.9) on Jun. 25, 2014.

Official Action dated Jan. 24, 2014 issued in Russian counterpart application (No. 2012147794/02) with English translation.

International Search Report dated Jul. 12, 2011 issued in PCT counterpart application (No. PCT/JP2011/060589).

* cited by examiner

CUTTING INSERT HAVING CHIP BREAKER

CROSS-REFERENCE TO RELATED APPLICATIONS

This is a Continuation-in-part of International application No. PCT/JP2011/060589, filed 6 May 2011 and published as WO 2011/142297A1 on 17 Nov. 2011, which claims the benefit of Japanese Patent Application No. 2010-109587, filed 11 May 2010. The contents of the aforementioned applications are incorporated by references in their entirety.

BACKGROUND OF THE INVENTION

1. Field of the Invention

The present invention relates to a cutting insert used for cutting processing of a metal material by being detachably attached to a tool body.

2. Description of the Related Art

A cutting insert disclosed in Japanese Patent Laid-Open No. 2007-175788 has an approximately polygonal plate shape, in which a breaker projection having a standing wall surface which stands upward from a rake face on at least one of its nose portions and also protrudes toward a tip end of the nose portion is formed, and the rake face connected at least to the whole of or a part of a circumference of the standing wall surface is constituted by a first rake face extending inward from a cutting edge and a second rake face extending inward continuously from this first rake face and continuing to the standing wall surface.

Two-stage rake angles, that is, a first rake angle and a second rake angle are formed on the nose portion of the cutting insert of Japanese Patent Laid-Open No. 2007-175788, and as a result, a concavity is formed in the nose portion of a chip breaker. Therefore, the cutting insert of Japanese Patent Laid-Open No. 2007-175788 is excellent in heat and crack resistance and is designed so as to be able to apply a tool material which is poor in heat and crack resistance such as cermet, to light cutting including so-called finishing cutting, in which a cutting amount and a feeding amount are both small. However, although the cutting insert in Japanese Patent Laid-Open No. 2007-175788 effectively functions from finishing to light cutting, there are many cases where the cutting insert does not function effectively in a cutting condition of heavy cutting. Therefore, the cutting insert of Japanese Patent Laid-Open No. 2007-175788 cannot handle the cutting conditions from light cutting to heavy cutting, with one cutting insert.

SUMMARY OF THE INVENTION

The present invention has been made in order to solve the above-described problems. That is, the present invention has an object to provide a cutting insert that can effectively handle cutting conditions from light cutting to heavy cutting, with one cutting insert.

A cutting insert according to the present invention is formed of a plate-like member with a substantially polygonal outer shape and including:

- a rake face with a chip breaker which is formed on at least one of top and bottom surfaces;
- a flank formed on an outer peripheral surface extending between the top and bottom surfaces; and
- a cutting edge formed on an intersection portion between the rake face and flank, the cutting edge comprising an arc-shaped cutting edge being curved in an arc shape and located on at least one of nose portions, a working cutting edge extending from one side of the arc-shaped cutting edge, and a linear cutting edge extending from the other side of the arc-shaped cutting edge, wherein
- a chip-breaker concave portion is formed in the vicinity of the arc-shaped cutting edge on the rake face;
- a breaker projection stands from a bottom surface portion of the chip-breaker concave portion; and
- the chip-breaker concave portion is defined by an inclined surface which is curved in a concave manner and which is smoothly connected to the bottom surface portion while being gradually inclined toward the bottom surface portion, from a peripheral edge portion on the nose portion side to the bottom surface portion.

The cutting insert of the present invention improves chip processing performance not only in the case of being used in heavy cutting but also in the case of being used under a milder cutting condition of light cutting side than that of the heavy cutting, and moreover, abnormal damage such as a defect does not occur. A factor by which the chip-breaker concave portion can improve the chip processing performance on the light cutting side is a difference in height of the chip breaker generated relatively in correspondence with a depth of a chip breaker groove. In a cutting condition of the light cutting side in which the larger the difference in the height of the chip breaker is, the stronger a restricting force becomes when chips collide with each other and outflow of chips become easily unstable, the chips can be made stable and the chip processing performance can be improved. Therefore, an application range on the basis of a chip breaker shape for heavy cutting can be expanded to the light cutting side. When being used on the light cutting side, mainly the chip-breaker concave portion draws the chips, and the breaker projection with the relatively increasing difference in height appropriately processes the chip.

In addition, according to the present invention, by setting the chip-breaker concave portion from the peripheral edge portion on the nose portion side of the chip-breaker concave portion to the bottom surface portion, to an inclined surface which is curved in a concave manner and which is smoothly connected to the bottom surface portion while being gradually inclined toward the bottom surface portion, a load at the time of heavy cutting is sufficiently withstood and a defect caused by stress concentration or the like can be prevented. Particularly, it has been found that a starting point of a defect easily occurs in the vicinity of the nose portion, and thus this can be effectively prevented.

Further features of the present invention will become apparent from the following description of exemplary embodiments (with reference to the attached drawings).

DESCRIPTION OF THE EMBODIMENTS

Figure 1:
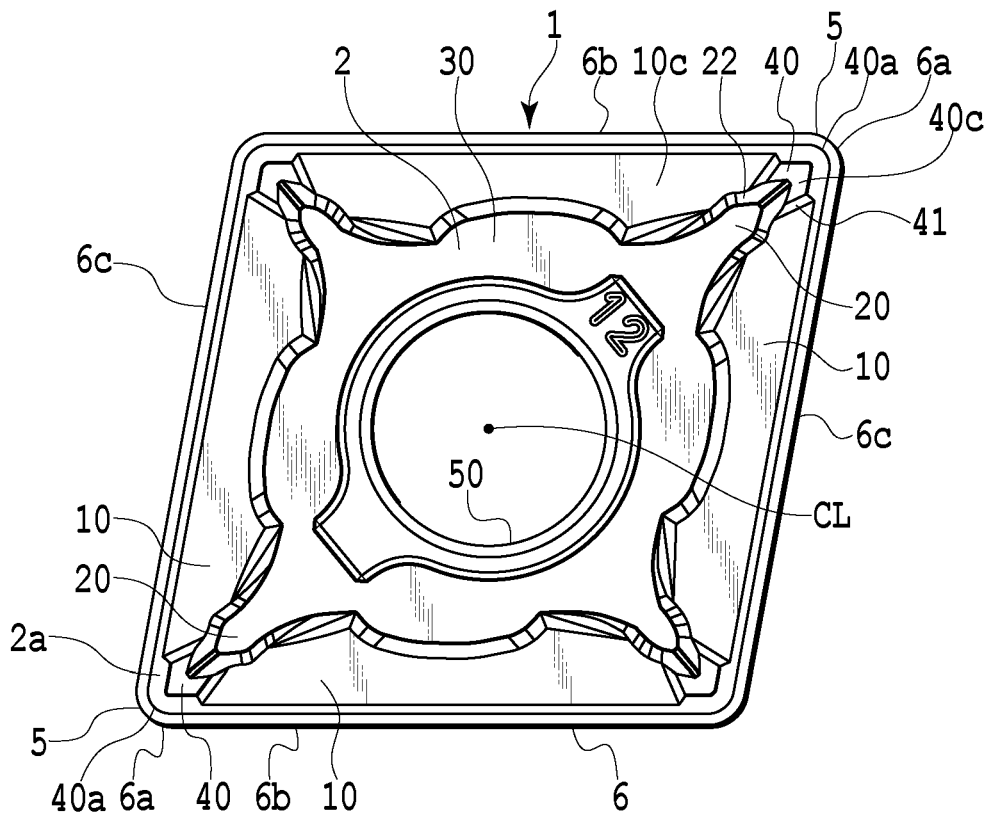
FIG. 1 is a plan view of a cutting insert which is a first embodiment.

Embodiments of the present invention will be described by referring to the drawings.

First Embodiment

Figure 2:
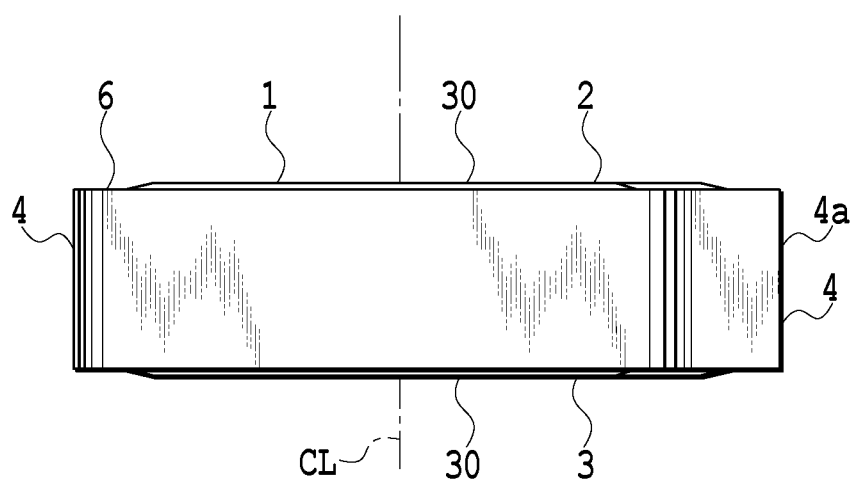
FIG. 2 is a front view of the cutting insert illustrated in FIG. 1.
Figure 3:
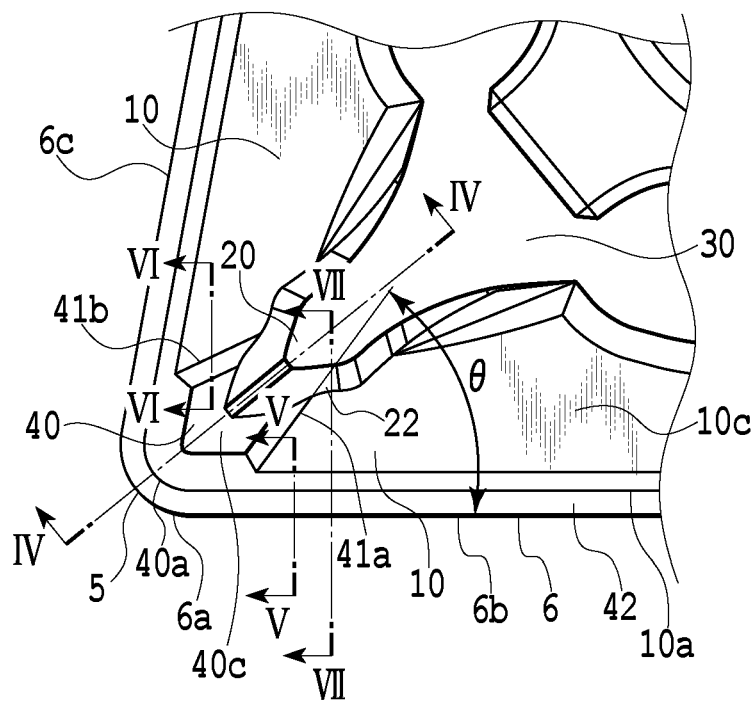
FIG. 3 is an enlarged plan view of the vicinity of a nose portion of the cutting insert illustrated in FIG. 1.

FIG. 1 is a plan view of a cutting insert which is a first embodiment. FIG. 2 is a front view of the cutting insert illustrated in FIG. 1. FIG. 3 is an enlarged plan view of the vicinity of a nose portion of the cutting insert illustrated in FIG. 1. The cutting insert of the present embodiment has no particular hand, but is symmetric with respect to a bisector B at an apex angle of the nose portion. However, the cutting insert of the present invention is not limited to a cutting insert without particular hand, and the cutting insert described below will be described as an example in which the cutting insert is used as right hand and has a linear cutting edge 6b as a main cutting edge of a working cutting edge in charge of most of the cutting during a cutting work and a linear cutting edge 6c as a sub cutting edge (front cutting edge) of the working cutting edge. Although description will be omitted in the following, if the cutting insert in FIG. 3 is used as left hand conversely, the linear cutting edge 6c serves as the main cutting edge of the working cutting edge and the linear cutting edge 6b serves as the sub cutting edge.

Figure 4:
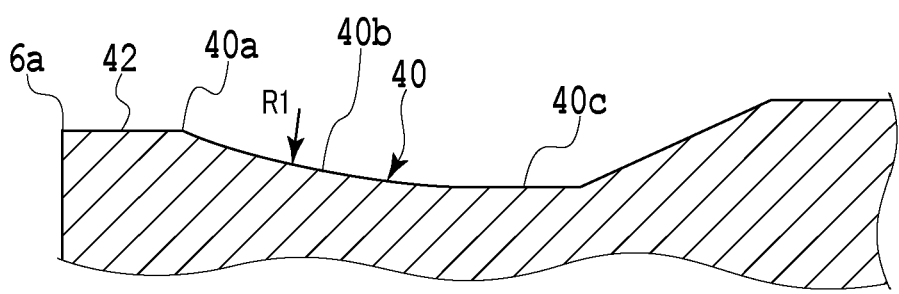
FIG. 4 is a IV-IV line cross-sectional view in FIG. 3.

FIG. 4 is a IV-IV line cross-sectional view in FIG. 3. The IV-IV line is a line on the bisector B at the apex angle defined by the nose portion 5. The apex angle here refers to an angle sandwiching the nose portion 5, in angles formed by the linear cutting edge 6b and the linear cutting edge 6c.

Figure 5:
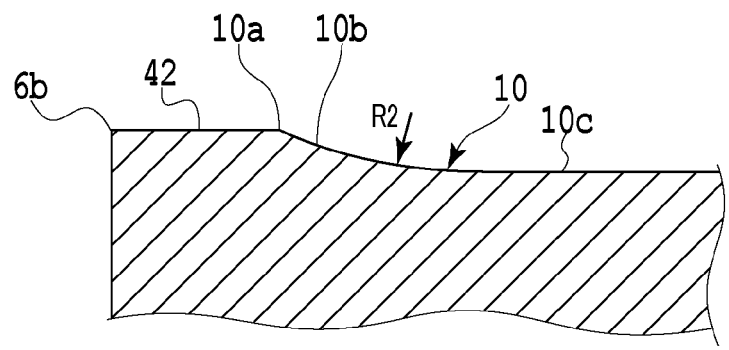
FIG. 5 is a V-V line cross-sectional view in FIG. 3.

FIG. 5 is a V-V line cross-sectional view in FIG. 3. The V-V line is a cross-sectional line of a chip breaker groove 10 in the vicinity of a first peripheral edge portion 41a on the side of the linear cutting edge 6b of a chip-breaker concave portion 40, in a direction orthogonal to the linear cutting edge 6b which is the main cutting edge of the cutting edge 6. Meanwhile, the "vicinity of the first peripheral edge portion 41a" refers to a region as close as possible to the first peripheral edge portion 41a on the side of the linear cutting edge 6b of the chip-breaker concave portion 40 illustrated in FIG. 3, in the cross-sectional line where a chip breaker groove bottom portion 10c of the chip breaker groove appears. Moreover, the chip breaker groove bottom portion 10c is the deepest portion when viewed on a cross-section in a direction orthogonal to the linear cutting edge 6b. When there is a plane in the chip breaker groove bottom portion 10c, a straight line appears in the section. When a straight line does not appear, the deepest point is set to the chip breaker groove bottom portion 10c.

Figure 6:
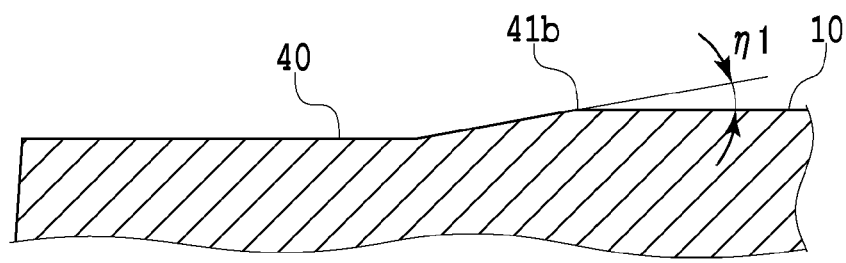
FIG. 6 is a VI-VI cross-sectional view in FIG. 3.

FIG. 6 is a VI-VI line cross-sectional view in FIG. 3. The VI-VI line is an arbitrary cross-sectional line intersection with the second peripheral edge portion 41b on the side far from the linear cutting edge 6b of the chip-breaker concave portion 40 illustrated in FIG. 3, in a direction orthogonal to the linear cutting edge 6b.

Figure 7:
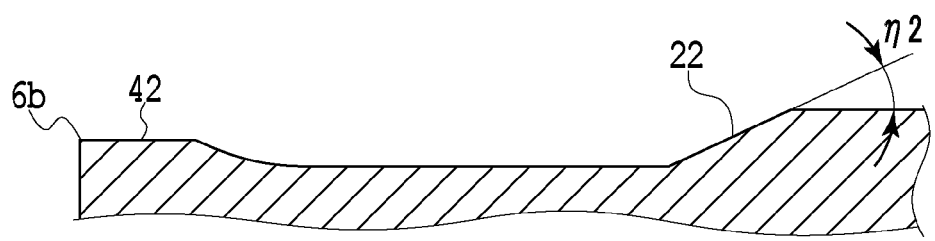
FIG. 7 is a VII-VII line cross-sectional view in FIG. 3.

FIG. 7 is a VII-VII line cross-sectional view in FIG. 3. The VII-VII line is a cross-sectional line at a position where a breaker projection 20 is brought the closest to the linear cutting edge 6b in a direction orthogonal to the linear cutting edge 6b. In the embodiment in FIG. 3, a rising angle η2 of a standing wall surface 22 of the breaker projection is made constant, and thus the VII-VII line is illustrated at a position slightly shifted from the position where the breaker projection 20 is brought the closest to the linear cutting edge 6b for the purpose of making the figure easily understood. Moreover, the term "chip processing" used in the following description means solving various problems caused by chips in performing cutting processing such that generated chips entangle the tool body or are diffused. Therefore, the cutting insert with "high chip processing performance" has a lower frequency of occurrence of trouble at the time of the cutting processing than a cutting insert with "low chip processing performance."

In FIGS. 1 and 2, this cutting insert 1 has an approximately diamond-shaped plate shape, in which a cutting edge 6 is formed on peripheral edges of a top surface 2 on which a rake face 2a is formed and a bottom surface 3, and an outer peripheral surface 4 extending between the top surface 2 and the bottom surface 3 in a direction of a central axis CL perpendicular to the top surface 2 and the bottom surface 3 serves as a flank 4a. The cutting edge 6 has an arc cutting edge 6a provided at a nose portion 5 at an 80° corner and a pair of linear cutting edges 6b and 6c extending, respectively, from this arc cutting edge 6a. The flank 4a is a flank having a relief angle of 0° orthogonal to the top surface 2 and the bottom surface 3 (in parallel with the central axis CL). A material of the cutting insert is selected from hard materials such as cemented carbide, cermet, ceramic and the like, or the hard materials coated with PVD or CVD coating film on the surface.

The chip breaker groove 10 is formed on the rake face of the top surface 2 and the bottom surface 3, and a narrow land 42 extending inward from the cutting edge 6 on a cross-section that is orthogonal to the cutting edge 6 is formed along the peripheral edge as illustrated in FIGS. 1 and 4. A boss face 30 is formed at the center part of the top surface 2 and the bottom surface 3. The boss face 30 is formed so as to surround a cylindrical mounting hole 50 penetrating the top surface 2 and the bottom surface 3 in a thickness direction and is a flat surface higher than the cutting edge 6, in the thickness direction of the cutting insert. This boss face 30 functions as a seating surface brought into contact with a bottom surface of a chip seat, when this cutting insert is attached to the chip seat (not shown) provided on a tool body of the cutting tool such as a turning tool.

As illustrated in FIGS. 1, 3, and 4, the standing wall surface 22 of the breaker projection 20 as a chip breaker stands, from a bottom surface portion 40c of the chip-breaker concave portion 40 in the bisector B direction of the apex angle defined by the nose portion 5. Particularly, in the cutting insert 1, the chip-breaker concave portion 40 is provided only between the nose portion 5 and the breaker projection 20. Therefore, a difference in height of the chip breaker portion with which chips are brought into contact at the time of heavy cutting decreases appropriately and also, the difference in height of the chip breaker portion with which the chips are brought into contact at the time of light cutting increases appropriately. As a result, the cutting insert 1 can appropriately process both the chips generated at the time of heavy cutting and the chips generated at the time of light cutting. If it is not necessary to use the both surfaces of the cutting insert 1 and when using only one surface, the height of the wall of the chip breaker is not restricted but the wall surface can be arranged freely. However, in the case of the negative cutting insert 1 having the both surfaces used as in the present invention or the so-called double-sided chip breaker, the height of the wall of the chip breaker is restricted to a certain value in order to ensure a seating surface on the bottom surface side. Therefore, in order to improve chip processing performance on the light cutting side to thereby raise the wall of the chip breaker, it is effective to provide the chip-breaker concave portion 40 and to adjust the relative difference in the height. Moreover, it is effective that the standing wall surface 22 of the breaker projection 20 which further improves the chip processing performance at the time of light cutting stands from the bottom surface portion 40c of the chip-breaker concave portion 40. The standing wall surface 22 is formed on the peripheral edge of the breaker projection 20. In the present embodiment, the height of the top portion of the breaker projection 20 has the same height as that of the boss surface 30.

The chip-breaker concave portion 40 includes an inclined surface 40b which is curved in a concave manner with a predetermined radius of curvature R1 and which is smoothly connected to the bottom surface portion 40c while being gradually inclined toward the bottom surface portion 40c, from a peripheral nose edge portion 40a on the nose portion 5 side to the bottom surface portion 40c. Meanwhile, the peripheral nose edge portion 40a on the nose portion 5 side is illustrated as a curve where the land 42 and the inclined surface 40b intersect with each other in the present embodiment, but when the land 42 and the inclined surface 40b are smoothly connected to each other, the connection portion serves as the peripheral nose edge portion 40a. The radius of curvature R1 of the inclined surface 40b is 1 mm or more, preferably 2 mm or more and 3 mm or less. When the radius of curvature R1 of the inclined surface 40b has the above-described size, the chip processing performance in the cutting condition on the light cutting side is improved and also, a defect at the time of the heavy cutting is prevented at the same time. When the radius of curvature R1 is less than 1 mm, a load at the time of the heavy cutting cannot be withstood, and a starting point of a defect might be caused by stress concentration. Moreover, when this radius of curvature R1 exceeds 4 mm, the chips generated in working under the cutting condition on the light cutting side is no longer withdrawn into the chip-breaker concave portion 40, and the chip processing performance might be impaired. Meanwhile, the heavy cutting here means a cutting condition for turning of carbon steel, for example, with the maximum cutting of 3 mm or more and the maximum feeding of 0.3 mm/rev or more, while the light cutting refers to a turning condition with the cutting of approximately 1.0 mm to 3 mm and the maximum feeding of approximately 0.2 mm/rev. It should be noted that the radius of curvature R1 of the inclined surface 40b also relates to the size of the cutting insert. This is because the larger the size of the cutting insert is, the higher the cutting condition tends to become in use. The radius of curvature R1 of the inclined surface 40b is preferably 5% or more and 30% or less of a reference inscribed circle of the cutting insert.

In the present embodiment, the bottom surface portion 40c of the chip-breaker concave portion 40 forms a plane. In FIGS. 1 and 3, a solid line indicating this plane range is illustrated. The roundness connected to the bottom surface portion 40c has the radius of curvature R1 in contact with the plane of the bottom surface portion 40c from the cutting edge 6 side. In the present embodiment, the inclined surface 40b is connected to the bottom surface portion 40c at a certain radius of curvature from the peripheral nose edge portion 40a. However, it is not limiting. A plane does not necessarily have to be present in the bottom surface portion 40c, and it may be a curved surface. When the bottom surface portion 40c has a curved surface, there is no plane, and thus the deepest portion of the curved surface is included in the bottom surface portion 40c. Meanwhile, the radius of curvature R1 of the inclined surface 40b connected to the bottom surface portion 40c does not have to be constant, but may change the size in the chip-breaker concave portion 40. For example, it is effective to configure such that the closer the curved surface is to the nose portion 5, the larger the radius of curvature R1 may be set, and the closer it is to the first peripheral edge portion 41a on the linear cutting edge 6b side of the chip-breaker concave portion 40, the smaller the radius of curvature may be set (not shown). Moreover, the inclined surface 40b does not have to be connected to the bottom surface portion 40c at a certain radius of curvature from the peripheral nose edge portion 40a on the nose portion 5 side. For example, a cross-sectional shape of the inclined surface 40b may be a short straight line from the peripheral nose edge portion 40a and may be connected to the bottom surface portion 40c following the straight line, at a certain radius of curvature. The radius of curvature when being connected to the bottom surface portion 40c is important.

In the V-V line cross-sectional view orthogonal to the linear cutting edge 6b in FIG. 5, the chip breaker groove 10 in the present embodiment is provided with the narrow land 42 extending inward from the linear cutting edge 6b. The chip breaker groove 10 includes an inclined surface 10b which is curved in a concave manner and which is smoothly connected to the bottom surface portion 10c while being gradually inclined toward the bottom surface portion, from a peripheral edge portion 10a on the linear cutting edge 6b side to the chip breaker groove bottom portion 10c. A radius of curvature of the inclined surface 10b is R2. The radius of curvature R2 may be smaller than the radius of curvature R1 of the inclined surface 40b of the chip-breaker concave portion 40. Since it is not necessary to increase the radius of curvature R2 of the inclined surface 10b of the chip breaker groove 10, design freedom relating to the cross-sectional shape of the chip breaker groove 10 is ensured. The radius of curvature R2 of the inclined surface 10b of the chip breaker groove 10 can be set to, for example, 0.5 mm or less.

It is not preferable that a restricting force on the chips is too strong at the time of heavy cutting. When the chips are restricted strongly during heavy cutting, an increase in cutting resistance or occurrence of chattering vibration causes deterioration of roughness on a worked surface or causes abnormal damage such as a defect in the cutting insert. In the present embodiment, by the fact that the chip-breaker concave portion 40 is provided only between the vicinity of the nose portion 5 and the vicinity of a leading end of the breaker projection 20, an average value of the breaker depth at the time of heavy cutting becomes small. Therefore, the height difference of the wall of the chip breaker acting at the time of the heavy cutting becomes smaller than that at the time of light cutting, and the restricting force on the chips does not become too strong. As a result, the cutting insert 1 can appropriately handle the chips.

The chip-breaker concave portion 40 also has an effect of decreasing a contact area between the cutting insert 1 and the chips not by withdrawing the chips generated at the time of the heavy cutting into the chip-breaker concave portion 40, but conversely, by causing them to float up. When the contact area between the cutting insert 1 and the chips decreases, the cutting resistance is reduced, a heat generation amount is suppressed, abrasion on the tool is suppressed, and a tool life is prolonged. In order to cause the chips at the time of the heavy cutting to float up in the chip-breaker concave portion 40, the standing wall surface 22 of at least one breaker projection 20 is made to stand up from the bottom surface portion 40c of the chip-breaker concave portion 40. By arranging the breaker projection 20 as above, the breaker projection 20 acts in a direction that lifts up chips.

When the ridge line of the first peripheral edge portion 41a on the linear cutting edge 6b side of the chip-breaker concave portion 40 (hereinafter this portion will be referred to as a "first concave-portion peripheral edge portion 41a") is formed so as to separate from the nose portion 5 as it separates from the cutting edge, there is no obstacle in an outflow direction of the chips at the time of the heavy cutting, and an effect by which the first concave-portion peripheral edge portion 41a is not allowed to work as a chip breaker. Therefore, the chips generated at the time of the heavy cutting float up in the chip-breaker concave portion 40, and a bad influence at the time of the heavy cutting as a result of presence of the concave portion is solved. When the shape of the first concave-portion peripheral edge portion 41a is expressed by an angle θ formed with the linear cutting edge 6b, it is preferable that 40°≤θ°≤85° is set.

Figure 8:
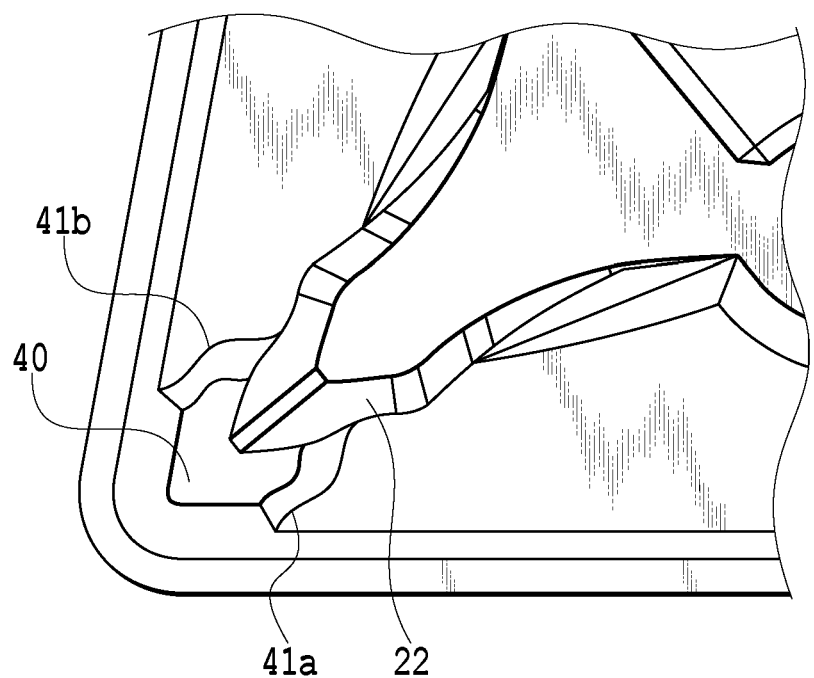
FIG. 8 is an enlarged plan view of the vicinity of the nose portion of the cutting insert which is a second embodiment.

The ridge line of the first concave-portion peripheral edge portion 41a does not have to be a straight line, but may separate from the nose portion 5 as it separates from the cutting edge 6 as in FIG. 8, for example. Moreover, as another shape, it may be a convex curve, a concave curve or a curve obtained by combining concavity and convexity or straight lines. Meanwhile, since the chip breaker acts only in a range in contact with the chips in general, the shape from the cutting edge 6 up to the contact range with the chips is important, and the shape of the portion sufficiently away from the cutting edge 6 is not particularly important. However, the contact range of the chips is changed in accordance with the cutting condition or a workpiece.

An inclined wall 41 rises from either side of the chip breaker concave portion 40 to meet a corresponding chip breaker groove 10 at one of the peripheral edge portions 41a, 41b. A wall-surface rising angle η1 toward the second peripheral edge portion 41b on the side far from the linear cutting edge 6b of the chip-breaker concave portion 40 (hereinafter this portion will be referred to as a "second concave-portion peripheral edge portion 41b") is smaller than the rising angle η2 of the standing wall surface 22 of the breaker projection 20. That is, since η1<η2 holds, the second concave-portion peripheral edge portion 41b does not work as a chip breaker at the time of the heavy cutting. In setting of the wall-surface rising angles η1 and η2, the rising angle in the direction facing the outflow direction of the chips is highly associated with the fact of whether or not the first concave-portion peripheral edge portion 41a and the second concave-portion peripheral edge portion 41b works as chip breakers. The outflow direction of the chips is changed depending on the cutting condition, but in the cutting insert 1 of the present embodiment, the wall-surface rising angle is defined in a cross-section in the direction orthogonal to the linear cutting edge 6b closer to the chip outflow direction at the time of the heavy cutting.

Meanwhile, when the cross-sectional shape of the wall surface continuing from the bottom surface portion 40c of the chip-breaker concave portion 40, to the second concave-portion peripheral edge portion 41b is not linear, the wall-surface rising angles η1 and η2 when the top portion of the wall surface is rounded, for example, cannot be obtained from comparison between the tangent line in the vicinity of the top surface of the above-described wall surface continuing to the second concave-portion peripheral edge portion 41b and the tangent line in the vicinity of the top surface of the standing wall surface 22 of the breaker projection 20, and thus the wall-surface rising angles are set at an appropriate position to be a reference. For example, it is the boss surface 30. After the position to be the reference is set, the rising angle η1 of the wall surface at the height away from the reference place by a certain distance is compared with the rising angle η2 of the standing wall surface 22 of the breaker projection 20. In the case of the present embodiment, since the height of the top surface of the second concave-portion peripheral edge portion 41b and the height of the top surface of the breaker projection 20 are different from each other, the rising angles η1 and η2 in the vicinity of the top surface cannot be compared with each other. In the comparison between the tangent lines at the positions with the same height difference from the boss surface 30, it is preferable that the rising angle η1 of the above-described wall surface is smaller than the rising angle η2 of the standing wall surface 22. Moreover, in the case of a cross-sectional shape having an arc in the vicinity of the top surface, since it makes no sense to compare the tangent angles at the arc-shaped top portion, the tangent angles at the same heights are set to η1 and η2, respectively, and are compared with each other also in this case.

In this embodiment, the first concave-portion peripheral edge portion 41a is arranged so as to start at a position away from the nose portion 5 by approximately 0.1 mm to 3 mm and to separate also from the nose portion 5 as it separates from the cutting edge 6. As the position where the first concave-portion peripheral edge portion 41a starts, an appropriate value in relation to a corner radius of the nose portion 5 is selected.

In the present embodiment, the reason why the chip-breaker concave portion 40 is formed symmetrically with respect to the bisector B at the apex angle of the nose portion 5 is to obtain similar cutting performance for both uses even when a use direction of the tool is such that the right side to the nose portion 5 is mainly used as the working cutting edge and when the left side is mainly used as the working cutting edge. That is, this shape is employed in order that the cutting insert 1 of the present embodiment may be used as a cutting insert without particular hand. Therefore, the first concave-portion peripheral edge portion 41a and the second concave-portion peripheral edge portion 41b are preferably designed so that the required ridge line shapes and the wall-surface rising angles are different from each other in view of the functions, but in this embodiment, the chip-breaker concave portion 40 is formed symmetrically with respect to the bisector B of the apex angle of the nose portion 5 and also, the ridge line shapes as described above of the first concave-portion peripheral edge portion 41a and the second concave-portion peripheral edge portion 41b, and the magnitude relationship between the rising angle η1 of the above-described wall surface and the rising angle η2 of the standing wall surface 22 are both achieved at the same time. Therefore, the similar cutting performance can be obtained for both uses of the right and left cutting edges.

In the present embodiment, as illustrated in, for example, FIGS. 4 and 5, the rake face 2a is formed to have a relatively smooth cross-sectional shape. However, the rake angle can also be changed in stages in the cross-sectional shape like, for example, a first rake angle and a second rake angle. Moreover, the rake angle can also be changed continuously or intermittently as it separates from the nose portion 5 along the cutting edge 6.

The cutting insert of the present invention is not limited to the above-described embodiments, but is capable of various changes and additions within a range not departing from the gist of the present invention. Though not shown, the outer shape of the cutting insert may be a polygonal plate shape other than the diamond plate shape, and may be a so-called positive cutting insert having the relief angle larger than 0°. Moreover, the chip breaker groove 10 does not have to be provided over the whole periphery of the cutting edge 6, but can be provided only on a desired range. The number of the breaker projections 20 does not have to be 1 but it is also effective that a plurality of breaker projections may be provided around the nose portion so as to appropriately handle various chip outflow directions. The standing wall surface 22 of the breaker projection 20 may be configured by a single or a plurality of planes or curved surfaces. Moreover, honing composed of planar or curved chamfering may be added to the cutting-edge ridge portion along the cutting edge 6 in order to reinforce the edge or a negative angle may be added and the land 42 of the cutting-edge ridge portion may be inclined. Furthermore, conversely, a positive angle may be added and the land 42 may be inclined for the purpose or the like of lowering the cutting resistance. The cutting insert of this invention can also be applied to a threading cutting insert (not shown) or milling cutting insert (not shown).

INDUSTRIAL APPLICABILITY

The cutting insert of this invention can be used for cutting processing of a metal material by being detachably attached to a tool body in the same way as a prior-art cutting insert. Moreover, a manufacturing method thereof is the same as that of the prior-art cutting insert.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A cutting insert formed of a plate-like member with a substantially polygonal outer shape and comprising:
    a rake face with a chip breaker which is formed on at least one of top and bottom surfaces;
    a flank formed on an outer peripheral surface extending between the top and bottom surfaces; and
    a cutting edge formed on an intersection portion between the rake face and flank, the cutting edge comprising:
        an arc-shaped cutting edge being curved in an arc shape and located on at least one nose portion of the cutting insert,
        a working cutting edge extending from one side of the arc-shaped cutting edge, and
        a linear cutting edge extending from the other side of the arc-shaped cutting edge, wherein
    a chip-breaker concave portion is formed in the vicinity of the arc-shaped cutting edge on the rake face;
    a breaker projection stands from a bottom surface portion of the chip-breaker concave portion; and
    the chip-breaker concave portion is defined by an inclined surface which is curved in a concave manner and which is smoothly connected to the bottom surface portion while being gradually inclined toward the bottom surface portion, from a peripheral nose edge portion on the nose portion side to the bottom surface portion.

2. The cutting insert according to claim 1, wherein
    in the rake face, a chip breaker groove is formed adjacent to the chip-breaker concave portion and the breaker projection;
    the chip breaker groove comprises an inclined surface which is curved in a concave manner and which is smoothly connected to a chip breaker groove bottom portion while being gradually inclined toward the chip breaker groove bottom portion, from a peripheral edge portion on the working cutting edge side to the chip breaker groove bottom portion; and
    a radius of curvature R2 of the inclined surface of the chip breaker groove is smaller than a radius of curvature R1 of the inclined surface of the chip-breaker concave portion.

3. The cutting insert according to claim 2, wherein
    the peripheral edge portion on the chip breaker groove side of the chip-breaker concave portion extends from the nose portion side to the breaker projection side.

4. The cutting insert according to claim 1, wherein
    the chip-breaker concave portion is formed of a first wall surface rising from the bottom surface portion of the chip-breaker concave portion to a peripheral edge portion on the chip breaker groove side; and
    a rising angle η1 of the first wall surface relative to a plane in parallel with the top and bottom surfaces is smaller than a rising angle η2 of a second wall surface of the breaker projection relative to a plane in parallel with the top and bottom surfaces.

5. The cutting insert according to claim 1, wherein
    the chip-breaker concave portion is formed symmetrically with respect to a bisector of an apex angle defined by the nose portion.

6. The cutting insert according to claim 1, wherein
    the substantially polygonal shaped is a diamond shape.

7. The cutting insert according to claim 1, wherein
    the breaker projection is co-planar with a boss face of the cutting insert, the boss face being capable of functioning as a seating surface when the cutting insert is attached to the chip seat of cutting tool.

8. The cutting insert according to claim 7, wherein
    the cutting insert has identical top and bottom surfaces, each having a boss face; and
    the boss faces on the top and bottom surfaces define the thickness of the cutting insert in a side view of the cutting insert.

9. A cutting insert formed of a plate-like member with a substantially polygonal outer shape and comprising:
    opposing top and bottom surfaces and an outer peripheral surface extending between the top and bottom surfaces;
    a flank formed on the outer peripheral surface;
    a rake face formed on at least the top surface;
    a cutting edge formed at an intersection of the rake face and flank, the cutting edge comprising:
        an arc-shaped cutting edge located on at least one nose portion of the cutting insert,
        a working cutting edge extending from a first side of the arc-shaped cutting, edge along the top surface, and
        a linear cutting edge extending from an opposite, second side of the arc-shaped cutting edge, along the top surface, and
    a chip breaker formed on the rake surface and comprising:
        a chip-breaker concave portion formed in the vicinity of the arc-shaped cutting edge on the rake face, the chip-breaker concave portion comprising a concavely curved inclined surface extending from a peripheral nose edge portion to a bottom surface portion of the chip-breaker concave portion which is located away from the nose portion;
        a breaker projection standing from the bottom surface portion of the chip-breaker concave portion at a location away from the nose portion; and
        a chip breaker groove formed on either side of the chip-breaker concave portion, adjacent to the breaker projection.

10. The cutting insert according to claim 9, further comprising:
    an inclined wall rising from either side of the chip-breaker concave portion to meet a corresponding chip breaker groove at a peripheral edge portion.

11. The cutting insert according to claim 10, wherein:
each peripheral edge portion extends from the nose portion to the breaker projection.

12. The cutting insert according to claim 11, wherein
a first wall surface rises from the bottom surface portion of the chip-breaker concave portion to one of the peripheral edge portions; and
a rising angle $\eta 1$ of the first wall surface relative to a plane in parallel with the top and bottom surfaces is smaller than a rising angle $\eta 2$ of a second wall surface of the breaker projection relative to a plane in parallel with the top and bottom surfaces.

13. The cutting insert according to claim 12, wherein
at least one chip breaker groove comprises a concavely curved inclined surface which extends from an associated peripheral edge portion towards a chip breaker groove bottom portion; and
a radius of curvature R2 of the concavely curved inclined surface of the chip breaker groove is smaller than a radius of curvature R1 of the inclined surface of the chip-breaker concave portion.

14. The cutting insert according to claim 13, wherein
the substantially polygonal shaped is a diamond shape;
the chip-breaker concave portion is formed symmetrically with respect to a bisector of an apex angle defined by the nose portion;
the breaker projection is co-planar with a boss face of the cutting insert, the boss face being capable of functioning as a seating surface when the cutting insert is attached to the chip seat of cutting tool; and
the cutting insert has identical top and bottom surfaces, each having a boss face, and the boss faces on the top and bottom surfaces define the thickness of the cutting insert in a side view of the cutting insert.

15. The cutting insert according to claim 11, wherein
the substantially polygonal shaped is a diamond shape.

16. The cutting insert according to claim 11, wherein
the chip-breaker concave portion is formed symmetrically with respect to a bisector of an apex angle defined by the nose portion.

17. The cutting insert according to claim 11, wherein
the breaker projection is co-planar with a boss face of the cutting insert, the boss face being capable of functioning as a seating surface when the cutting insert is attached to the chip seat of cutting tool.

18. The cutting insert according to claim 17, wherein
the cutting insert has identical top and bottom surfaces, each having a boss face; and
the boss faces on the top and bottom surfaces define the thickness of the cutting insert in a side view of the cutting insert.

* * * * *